Patented Oct. 18, 1932

1,883,675

UNITED STATES PATENT OFFICE

KARL FRANK AND KARL DIETZ, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY

CEMENT POWDER AND MORTAR POWDER

No Drawing. Application filed September 30, 1929, Serial No. 396,079½, and in Germany October 2, 1928.

The present invention relates to cement powders and mortar powders and process of preparing them.

Water-glass cementing compositions have hitherto been prepared by forming a paste from cement powder of a certain composition and a concentrated solution of commercial water-glass. This process, however, has some drawbacks. In consequence of the viscosity of the water-glass a great number of air bubbles are formed in the cementing compositions when preparing the paste. The hollow spaces thus formed often remain in the cemented material and they are the main cause of subsequent leakage. Furthermore, the mixing of cementing compositions with water-glass is always troublesome on the building-plot in consequence of the tough, viscid nature of the material which causes all tools to be very soiled. A further consideration is the difficulty of transporting the vessels which contain the water-glass and the danger to which the laborers are exposed on account of the corrosive properties of the alkaline solution.

Now we have found a process for preparing a mortar powder which can be made into a paste with ordinary water. According to our invention the binding agent, that is to say the water-glass, is added in a solid form to the mortar powder. There has to be used such a water-glass powder as readily dissolves in cold water. This condition is fulfilled by a water-glass powder which still contains water. Such water-glass powders can be prepared in various manners, such as for instance by precipitation from water-glass solutions, by evaporating or by spurting the water-glass solutions, or by mixing active silicic acid with alkalies according to those methods known by the literature.

Instead of water-glass there may also be used other silicates containing hydrous silicic acid which has been converted into its non-refractory form, for instance alkaline earth silicates of any origin; mixtures of such hydrous silicates with water-glass powder may also be used.

These hydrous readily soluble silicates are then mixed with the other constituents of the mortar powder, for instance substances which react with alkali. These substances are for instance silicon (described in U. S. Patent No. 1,818,888), silicon dioxide, opal, chalcedony, flintstone, sodium-silicon fluoride, or the like. All these materials possess the property of giving with alkali a strong reaction which is characterized by the capability of the powder to show when boiled for two hours with 25 times the quantity of caustic soda solution of 15 per cent. strength a loss of weight of at least 40 per cent. of the starting material. There may be used also such substances as are capable of reacting in a higher degree with alkali and thereby cause separation of or form during this reaction more or less acid-insoluble products. Furthermore, also silicon alloys may be used whose structure partly consists of pure silicon or of such a silicon as contains other constituents in a solid solution.

As filling material there may finally be added to the mortar powder also quartz, sand, flintstone, feldspar, chamotte, silicium carbide and similar materials, as they are used with the known water-glass cements. Cements may also be worked up in combination with the above named substances. The cement materials thus obtained are waterproof and acidproof.

For use, the cement or mortar is mixed with water; materials cemented by or made from the mixtures are more solid than those obtainable with the corresponding water-glass cements. In order to obtain a still more solid cemented material there may also be used water-glass solutions instead of water.

The above described cements may be used not only for preparing building material (mortar, béton), but also for preparing stones, filters, tubes, vessels, tiles, plates, posts, etc. If necessary the bodies thus prepared can subsequently be burnt.

The following examples serve to illustrate our invention, but they are not intended to limit it thereto:

(1) 600 g. of pulverized sodium water-glass of commerce which still contains 17–25 per cent of water, are mixed with 170 g. of finely ground sodium-silico-fluoride. This powder, mixed with two and a half times the quantity of sand and made into a paste with 9-10 per cent of water, gives an excellent acid-mortar which is stable to strong acids, but not to water.

(2) If to a mixture of 100 g. of sodium water-glass and of sodium-silico-fluoride of (Example 1) 10 g. of alumina-cement are added and two and a half times the quantity of sand calculated upon the mixture of sodium-water-glass and of silicon-fluoride-cement is added thereto, an acidproof and waterproof acid mortar is obtained when making a paste with 3-10 per cent of water.

(3) 600 g. of pulverized sodium-water-glass of commerce which still contains 17-25 per cent of water are mixed with 900 g. of a lead silicate which contains, besides other constituents, about 50 per cent of $P_bO_2$. If said powder is mixed with sand and made into a paste with water, as set forth in Example 1, it yields an acidproof and waterproof acid mortar which is also very solid. Said mortar sets more slowly than those described in Examples 1 and 2.

(4) For preparing heat-conducting, shaped bodies, such as, for instance, plates, tubes, and the like, it is advisable to use the following mixture:

210 g. of most finely pulverized sodium water-glass of commerce which contains about 17-25 per cent of water are intimately mixed with 60 g. of most finely ground sodium silicon fluoride; 730 g. of silicon-powder of different granular size are added thereto. Said powder is moistened with about 10 per cent of water and then moulded in a suitable pressing device.

The described mortar powder, mixed with about 30 per cent of water, is excellently suitable for lining acidproof tubes which are of good thermal conductivity.

We claim:

1. As new compositions of matter, cement powders and mortar powders containing hydrous, readily soluble silicates in a mixture with a substance of the group consisting of free silicon and silicon fluorides, said substances showing, when boiled in powdered form for 2 hours with 25 times the quantity of caustic soda solution of 15% strength, a loss of weight of at least 40% of the starting material.

2. As new compositions of matter cement powders and mortar powders containing hydrous readily soluble silicates in a mixture with a silicon fluoride.

3. As new compositions of matter cement powders and mortar powders containing hydrous readily soluble alkali silicates in a mixture with a silicon fluoride.

4. As new compositions of matter cement powders and mortar powders containing hydrous readily soluble silicates in a mixture with a sodium silicon fluoride.

5. As new compositions of matter cement powders and mortar powders containing hydrous readily soluble alkali silicates in a mixture with a sodium silicon fluoride.

In testimony whereof, we affix our signatures.

KARL FRANK.
KARL DIETZ.

CERTIFICATE OF CORRECTION.

Patent No. 1,883,675.  October 18, 1932.

KARL FRANK, ET AL.

It is hereby certified that error appears in the printed specification of the above numbered patent requiring correction as follows: Page 2, line 15, for "3-10" read "9-10"; and that the said Letters Patent should be read with this correction therein that the same may conform to the record of the case in the Patent Office.

Signed and sealed this 21st day of February, A. D. 1933.

M. J. Moore,
Acting Commissioner of Patents.

(Seal)